United States Patent Office 3,265,765
Patented August 9, 1966

3,265,765
BLOCK POLYMERS OF MONOVINYL AROMATIC
HYDROCARBONS AND CONJUGATED DIENES
Geoffrey Holden, Anaheim, and Ralph Milkovich,
Buena Park, Calif., assignors to Shell Oil Company,
New York, N.Y., a corporation of Delaware
No Drawing. Filed Jan. 29, 1962, Ser. No. 169,674
10 Claims. (Cl. 260—876)

This invention is concerned with novel block copolymers, their compositions and processes for their preparation. More specifically, the invention is directed to certain block copolymers which are useful without being vulcanized.

Rubbers and elastomers of either natural or synthetic origin require vulcanization in order to obtain useful elastomeric properties. Before vulcanization, rubbers possess tacky properties and low strength, which make them of little utility except as rubber cements. The optimum elastomeric properties are not attained until the rubber has been subjected to a vulcanization treatment such as by means of heating with sulfur, sulfur compounds, peroxides, irradiation, or other means. One of the alterations in property, which occurs together with desirable changes, is that of insolubilization in common hydrocarbon solvents. While this property may be of advantage in certain situations where solvents or oils may cause deterioration of the rubber, for many purposes (such as the application of paints and films made therefrom) insolubilization is in fact a substantial disadvantage. Because of it, it has been necessary in many cases to apply vulcanized rubbers in the form of latices, which entails the use of expensive dispersants, etc., which are little benefit to the rubber per se as well as creating costly transportation charges due to the large amount of water present in such latices. In the molding of many articles is has been found that the losses of vulcanized rubber may be unduly large. For example, vulcanization is sometimes effected by compounding the rubber with extenders and reinforcing agents as well as with a vulcanizing agent and then subjecting the compositions so formed to heating in a mold or extruder. However, the scrap material left from such operation is largely unuseable except as a filler or reclaim for new rubber compositions. In other words, it cannot be readily remolded since it is in a relatively intractable state with respect to workability or reprocessing.

Thermoplastics do not possess this latter disadvantage. Any scrap material obtained in the course of forming castings or moldings from a thermoplastic may be simply remelted and reused in the same or different casting or molding operation. In many instances this would be an exceedingly valuable property for a useable rubber composition to possess.

Numerous attempts have been made to copolymerize various polymerizable materials to obtain rubber-like substances. Some of these have been found to be useful but in substantially all cases it has been necessary to go through the above-described vulcanization procedures in order to obtain useful compositions. Furthermore, other attempts have been made to form so-called "block" polymers. By this is meant polymeric chains containing alternating blocks of homopolymers or of copolymers, each block differing materially from the next adjacent block. However, in forming such block copolymers, the ultimate elastomeric systems have not been obtained. This is due to the fact that the initiator, environments and solvents employed during polymerization have been such that the block copolymers formed have an undesirable structure such as would result from polymerization in polar solvents at low temperatures. This in turn means that the products have the poor properties of unvulcanized rubber and, in fact, possess mediocre to poor properties even after vulcanization. Such materials are therefore of little interest for the normal rubber end uses.

It is an object of the present invention to provide improved elastomeric compositions. It is another object of the present invention to provide novel block copolymers having substantially improved elastomeric properties. It is a further object of the invention to provide improved elastomeric block copolymers useful without vulcanization. It is a further object of the invention to improve the green strength of other rubber compositions by combination with the subject block copolymers. Other objects will become apparent during the following description of this invention.

Now, in accordance with the present invention, new compositions of matter are provided which have excellent rubber properties without vulcanization. These comprise elastomeric block polymers having the general formula $$A\text{---}B\text{---}A$$

wherein each A is an independently selected non-elastomeric polymer block having an average molecular weight of 2,000–100,000 and a glass transition temperature above about 25° C. and B is an elastomeric polymer block having an average molecular weight between about 25,000 and 1,000,000 and a glass transition temperature below about 10° C.

Preferably, these block polymers are those in which the elastomeric polymer block is that of a conjugated diene. Still more preferably, the block polymers are those in which the end blocks comprise polymer blocks of an alkenyl aromatic hydrocarbon connected by a block of a polymerized conjugated diene, the latter being one capable of having a cis 1,4-content of 80–100%, such as isoprene.

Still in accordance with the present invention, compositions are provided which have improved processability and green strength comprising a major proportion of an elastomeric homopolymer or random copolymer and 5–50% by weight of a block polymer of the above description. Still further improvements in both processability and green strength are achieved by the combination of an elastomeric polymer of conjugated dienes (e.g., isoprene) having a high (88–100%) cis 1,4-content and 5–30% by weight each of a block polymer of the above description and of a polymerized conjugated diene having a cis 1,4-content of 88–100% but of a relatively low average molecular weight in the order of 2,000–50,000.

Again in accordance with this invention, a special variety of the above described polymers comprises those having the general configuration $$A\text{---}C\text{---}A$$

wherein each A is an independently selected non-elastomeric polymer block having an average molecular weight from about 2,000 to about 100,000 and a glass transition temperature above 25° C., and C is an elastomeric polymer block having an average molecular weight of 25,000–1,000,000, the latter block containing an increasing ratio from one end to the other of the block of units of the monomer of blocks A, block C containing an average of 10–40% by weight of block A monomer units and having a glass transition temperature below 10° C. These special types of polymers will be referred to herein as "tapered blocks."

One aspect of this invention comprises the process of polymerizing a monomer to form a non-elastic block A to such a point that all monomer is consumed, adding monomers of type B and continuing polymerization until the elastic mid section is formed and until all type B monomers are polymerized, then injecting type A monomers to form the second terminal block A by continued polymerization.

Again in accordance with the present invention, a process is provided for the preparation of tapered block polymers comprising the steps of polymerizing the monomer of the non-elastomeric polymer such as an alkenyl aromatic hydrocarbon to form an initial block having a molecular weight of 2,000–100,000, in such a way that after this initial block is formed, the polymerization medium contains or has added thereto a further proportion of a monomer capable of forming non-elastomeric polymer. This mixture is then modified by the injection of monomers capable of forming an elastomeric polymer such as monomers of the cojugated diene type. Polymerization is then continued in such a way that the elastomeric mid section of the block polymer is formed. Under these conditons, the conjugated diene (or equivalent elastomeric forming monomer) polymerizes at a greater rate than does the monomeric unit of the non-elastomeric forming material. The result is that the mid section is "tapered," the section of the block forming immediately adjacent to the original non-elastomeric block predominating in the units of the elastomer-forming monomer and the block becoming increasingly rich, as polymerization proceeds, in units of the non-elastomeric type. The proportion of monomers utilized is such that after exhaustion of monomers of the elastomer-forming variety, an excess of the non-elastomeric forming monomer is present or can be added. Polymerization is then continued to form the second terminal block of non-elastomeric type.

The block polymers of this inventon are to be distinguished from graft polymers, wherein segments depend from intermediate points on a linear chain. In the present instance the blocks are built end-to-end from one "living polymer" block to the next.

An essential for the success of the present inventon comprises the utilization of polymerization environments, catalysts and monomers such that the elastomeric center block of the block polymer has a glass transition temperature below 10 C., preferably below 0° C. and still more preferably below —25° C. Usually it is good practice to achieve a cis content of 90–97% in the mid section when conjugated dienes such as isoprenes are used. Furthermore, while the terminal non-elastomeric blocks may have a molecular weight range from about 2,000–100,000 and a glass transition temperature above 25° C., it is preferred that these terminal blocks have average molecular weights from about 5,000 to about 50,000 each, and a glass transition temperature above 30° C., better still above 50° C. Also, while the elastomeric middle block may have average molecular weights from about 25,000 to 1,000,000, it is preferred that this be between about 50,000 and 500,000. The critical difference between the terminal blocks, which are non-elastomeric, and the middle block, which is elastomeric, may be expressed in ASTM Special Technical Bulletin No. 184:

"A substance that can be stretched at room temperature to at least twice its original length and, after having been stretched and the stress removed, returns with force to approximately its original length in a short time."

This defines the middle block and polymeric blocks which will not meet this definition consitute the non-elastomeric end blocks. The blocks are further defined by their glass transition temperatures as recited hereinbefore. The difference between the glass transition temperatures of end blocks A and center block B should at least be 40° C. preferably at least 100° C., and still more preferably at least 125° C. The end blocks in preferred polymers constitute 10–50% (better 15–40%) of the total polymer weight.

While the same monomers may be employed in either terminal or middle blocks in conjunction with different copolymerized monomers, the elastomeric or non-elastomeric character of the block will in most cases be determined by the ratio of the several monomers employed. For example, the elastomeric mid sections may comprise copolymers of ethylene with $C_{3-18}$ monoolefins, preferably $C_{3-6}$ olefins preferably alpha olefins. Rubbery copolymers of ethylene and propylene can be formed having an ethylene content between about 60 to about 70 mol percent. On the other hand, non-elastomeric copolymers of ethylene with the same type of olefins may be prepared which have non-elastomeric properties, particularly if the ethylene ratio is relatively high. In case of ethylene and propylene, for example, non-elastomeric copolymers are formed when the ethylene content is between about 80 and about 95 mol percent.

The elastomeric mid section can be a polymer block of essentially any synthetic elastomer preferably of an aliphatic conjugated diene, such as isoprene, methyl isoprene, butadiene, copolymers of the styrene-butadiene type, and butadiene-acrylonitrile.

The non-elastomeric end blocks may comprise homopolymers of the lower olefins such as polyethylene or polypropylene as well as polystyrene, polymethyl styrene, polyacrylonitrile, polychloro styrene, and polymethyl methacrylate as well as other non-elastomeric polymeric chains. Vinyl aromatic polymer blocks are preferably made from one or more monovinyl aromatic hydrocarbons of the benzene series such as styrene, vinyl toluene, vinylxylene, ethylvinyl benzene, isopropylstyrene, ethyl-vinyltoluene, tert.-butylstyrene or diethylstyrene, or copolymers of at least 70% by weight of one or more of such mono-vinyl aromatic hydrocarbons and not more than 30% by weight of alpha-methylstyrene or esters of acrylic or methacrylic acid such as ethylacrylate, butylacrylate or methylmethacrylate.

Preferably, the elastomeric mid section blocks are those composed of aliphatic conjugated diolefins while the non-elastomeric terminal blocks are those formed by polymerizing alkenyl aromatic hydrocarbons, preferably vinyl substituted aromatic hydrocarbons, still more preferably vinyl monocyclic aromatic hydrocarbons. The most preferred species of the subject copolymers comprises block polymers of styrene terminal groups with a mid section of polyisoprene, the polyisoprene unit having a cis 1,4-content of 80–100%, usually 85–97%.

The block polymers forming the basic aspects of this invention may be regarded as being of two types: (1) "pure" block polymers, in which the terminal blocks are distinctly separate with regard to the unit species from the mid section elastomeric block, and (2) block polymers employing the "tapered" mid section block referred to hereinbefore. Essentially, however, these must be considered together as requiring an elastomeric mid section coupling two terminal non-elastomeric blocks. Their method of preparation will differ essentially in the timing of injection of the monomer from which the major portion of the mid section elastomeric section is made.

While it is possible to utilize one type of initiator and/or medium for initial polymerization of a terminal block and another catalyst and medium for the mid section it is preferred that the same medium and essentially the same initiator be employed throughout the formation of the several blocks since this is the most efficient type of process. Of course temperatures times of polymerization, concentrations of polymer and monomer in solvent and ratio of initiator to monomer may be varied to optimize conditions for forming the initial terminal block on the one hand, thereafter the mid elastomeric section and finally the formation of the section terminal non-elastomeric block.

In the interest of obtaining the highest possible cis content consistent with the production of economically low cost polymers and at the same time having full control over the degree of and type of polymerization as well as the use of catalyst and media suitable for use in both terminal and mid section polymerization, it is preferred that the polymerization be one which utilizes a relatively inert hydrocarbon solvent in conjunction with a lithium based initiator. In the former method, the catalyst comprises lithium metal, and alkyl lithiums or other lithium compounds as described in U.S. Patents 2,849,432, 2,856,391 and 2,913,444. All of these result in the formation of synthetic polymers having the desired properties. Other lithium compounds include lithium hydrocarbyl organo lithium amides, but the alkyl lithium compounds are particularly preferred The alkyl lithiums include especially those having up to 8 carbon atoms per molecule. While the normal alkyl lithium compounds are useful, they entail certain disadvantages relative to an induction period at the start of polymerization. Branched chain and preferably secondary alkyl lithium compounds are preferred since induction periods are substantially limited. Suitable branched chain alkyl lithium compounds include especially secondary butyl lithium, isobutyl lithium, isoamyl lithium, secondary amyl lithium, and the like.

The inert hydrocarbon solvent is preferably an alpha olefin or lower alkane although aromatic hydrocarbons such as benzene, and the like may be utilized. Preferred aliphatic (including cycloaliphatic) hydrocarbon solvents include cyclohexane and mixtures thereof with aromatic hydrocarbons such as benzene.

Polymerization is normally conducted at temperatures in the order of −20 to about 100° C., preferably at temperatures between about 20 and 65° C. The proportion of initiator should be maintained as low as possible but may be varied over a relatively wide range from about 1 to about 200 parts per million based on the weight of the monomers present. The basic process when using a lithium based catalyst comprises forming a solution of the inert hydrocarbon and monomer from which the first terminal non-elastomeric polymer block is to be made. Preferably, as stated hereinbefore, this is an alkenyl, e.g., vinyl, aromatic hydrocarbon such as styrene or an alkylated styrene. The lithium initiator is then injected and the temperature of the mixture maintained within the range specified above and known to experts in the rubber art. Initiators temperatures, and solvents as well as monomer content are adjusted so as to produce a first terminal polymeric block having an average molecular weight between about 2.000 and 100,000.

In the preparation of the "pure" block polymers, the conditions are adjusted so that essentially no monomer is left in the reaction mixture at the time when the average molecule weight of the polymer is within the range specified above. At this time, the monomer from which the elastomeric mid section is to be produced is added. This is preferably a conjugated diene such as isoprene or methylisoprene. The temperature, initiator concentration, solvent ratio, etc., may be adjusted at this time to optimize the production of an elastomeric mid section block which attached to the first non-elastomeric terminal block previously produced. Again, conditions are adjusted so that essentially all of the second monomer is exhausted at the time the desired average molecular weight of the elastomeric mid section is obtained. After this, a second addition of a monomer capable of producing a non-elastomeric terminal block is made and polymerization is continued to the point where this second terminal block has obtained an average molecular weight of 2,000–100,000. The block copolymer so produced then has the general configuration

A—B—A as defined hereinbefore.

While it is preferred that the polymerization be conducted in solution, which results in the formation of a cement, under certain conditions and with certain catalysts, or initiators, emulsion polymerization may be employed. The block polymer, after its formation, is preferably precipitated by contact with a precipitant such as steam or water or a combination thereof in such a manner as to result in the formation of crumbs which are then separated from the aqueous medium and subjected to dewatering and drying procedures. Details involving the addition of chain terminators and the like are known in the art. Such terminators include materials such as water, $CO_2$, alcohols, esters, or acids. These are usually added after lithium based polymerization for the purpose of reaction with lithium end groups on each of the molecule chains.

Variations on the above described procedure are necessary for the preparation of the so-called "tapered" mid section. The variation generally comprises the use of an excess amount of monomeric units of the first type, namely, those employed for the formation of the non-elastic terminal blocks. At the time the latter reaches the desired molecular weight range (2,000–100,000) a sufficient amount of the same monomer (preferably 20–80% of the original monomer) is present in the mixture or is added thereto. Thereafter one or more monomers of the type capable of forming an elastomeric block is added and polymerization proceeds. It has been found that monomers of the latter type show a greater activity under a given set of catalytic conditions than those of the first type. Therefore, the end of the mid section block which is directly attached to the first non-elastic terminal block predominates in units of the type capable of forming elastomeric copolymers. As this mid section molecule weight increases, however, the proportion of the elastomeric units decrease relative to the non-elastic monomer source, the chain becomes increasingly rich in units of the latter type. Hence, the term "tapered" is applied to this type of mid section.

The proportion of units capable of forming non-elastic polymers present in this type of tapered mid section is between about 5 and about 50 weight percent (preferably 10–40%). At the time the desired mid section molecular weight is achieved the reaction mixture should contain or have added thereto sufficient monomers of the type capable of forming non-elastic terminal blocks in the virtual absence of any of the monomers forming elastic mid section blocks. Polymerization then proceeds with the formation of the non-elastic block to form the block polymers A—C—A in which the unit C is a tapered copolymer block as described above.

It has been discovered unexpectedly that the block polymers of this invention possess the unique feature of having highly desirable elastomeric properties even though they are unvulcanized. Consequently, they may be utilized directly after their formation without vulcanization although, if desired, they may be vulcanized by ordinary vulcanization procedures such as heating in the presence of sulfur, certain thiuram polysulfides or peroxides. However, since they may be directly applied without vulcanization, it is a striking feature of the invention that the subject block copolymers having an elastomeric mid section, non-elastomeric terminals may be molded by injection or other means to give products which behave similarly to vulcanized rubber. For example, one block copolymer comprised of a cis polyisoprene mid section and polystyrene end blocks when molded had a tensile strength of 2950 p.s.i. with an elongation of 1900% at break. This product contained nothing but the hydrocarbon polymer and a normal antioxidant, no compounding or vulcanizing agents having been added. Furthermore, the copolymer blocks can be reprocessed at temperatures above about 100° C., molded again and will give comparable properties.

A further unique point is that the molded (or raw) polymer in its final usable form is completely soluble in certain hydrocarbon solvents, preferably aromatic hydrocarbons such as benzene, toluene, or xylenes. This is a novel feature of a usable elastomer in view of the insolubility of all practical elastomeric compositions otherwise known.

Formation of chemical bonds between linear polymer molecules, commonly referred to as cross-linking, may lead to the formation of infinite networks. Vulcanization of rubbers is the most prominent example of a process of this sort. Through the action of sulfur, accelerators, and other ingredients present in the vulcanization recipe, sulfide cross-linkages are created by a mechanism not fully understood. Vulcanized rubbers, being typical network structures, are insoluble in all solvents which do not disrupt the chemical structure, and they do not undergo appreciable plastic, or viscous flow.

This solubility feature may be utilized in forming dispersions of the polymers in oils or greases to improve the stringiness or tack thereof and to improve adhesion of such compositions to metal surfaces which they are protecting and/or lubricating. Moreover, it indicates their utility in adhesive compositions. They may be dispersed in asphalt to improve hot temperature viscosity and low temperature ductility and flexibility. Use of the block polymers in petroleum waxes (1–50% by weight) improves the properties of the latter with respect to flexibility at low temperature. Addition of 1–30% of the copolymers to microcrystalline wax improves the toughness of the latter.

The new elastomers may be mixed with the usual rubber compounding materials such as carbon blacks, fillers, processing oils and the like and still provide satisfactory physical properties. Preferably, the elastomeric mid sections of the block copolymer should have lengths corresponding approximately to the average molecular weight between crosslinks of normal vulcanized rubber. Since the subject block copolymers may be utilized without vulcanization, the molecular weights of the end groups should be high enough to prevent movement of the chain ends under the applied stress in the time intervals of its application.

The subject block copolymers are not only useful per se for the formation of injection moldings, compression moldings, extrusions, film coatings, spray coatings or adhesives, but also for the formation of latices from which foam or dipped goods may be prepared as well as in compositions with other rubbers for the improvement in physical properties of the latter.

The block copolymers are especially useful for improving the processability of synthetic rubbers, especially elastomeric homopolymeric and random copolymeric olefinic (including mono- and diolefinic) particularly of conjugated dienes, for the particular purpose of improving the green strength thereof. This is especially noticeable when the subject block copolymers are present in an amount of 5–50% by weight based on the total rubber content. Such blends have a bulk consistency 10–50 times greater than that of the unmodified rubber and greatly reduce bulk flow with no impairment of dynamic properties of carbon black vulcanizates made therefrom.

A particularly advantageous composition is obtained by the combination of a conjugated diene rubber (either homopolymeric or random) (200,000–1,000,000 molecular weight), 5–30% of the subject block copolymers and 5–30% by weight of a polymerized conjugated diene having a cis 1,4 content of 88–100% but having a low average molecular weight in the order of 2,000–50,000. The presence of the latter component has been found to substantially improve the processability of synthetic diene polymers such as polyisoprene which may at times show poor processability and also at times exhibit poor green strength. Therefore, the combination of the subject high cis block copolymer (to improve green strength) and the low molecular weight polymerized conjugated diene (to improve processability) with the normal high molecular weight elastomeric polymer of a conjugated diene provides exceptionally good rubber compositions exhibiting excellent processability and a high green strength.

The block copolymers of the invention not only are characterized by low glass transition temperature of the elastomeric mid section and the relatively higher glass transition temperature of terminal non-elastomeric blocks, but also by their intrinsic viscosity which normally is within the range from about 0.7 to about 5.0. The polymers have average molecular weights from about 75,000 to about 2 million, preferably between 75,000 and 500,000.

The glass transition temperatures are preferably determined by dilatometric methods. A discussion of this phenomenon and a table of glass transition temperatures are given in Whitby, "Synthetic Rubber" (1954), pages 356–360. The following examples illustrate the preparation of the subject block polymers and their use in rubber compositions.

*Example I*

The physical character of the block copolymers varies widely with composition of which the following is one example: A copolymer was prepared according to method described in Example V consisting of styrene end blocks of approximately 25,000 average molecular weight and an isoprene center block of approximately 100,000 molecular weight. The following properties were obtained on molded and die cut specimens of this block polymer. The specimens were entirely free of any vulcanizing ingredients or any compounding ingredients other than a conventional rubber antioxidant.

| | |
|---|---|
| Tensile strength | 25% in 5 min. (no |
| Elongation at break | 3,000 p.s.i. (23° C.). |
| Modulus at 500% elongation | 1,000%. |
| Set at break | 400 p.s.i. |
| Resilience (falling ball) | 17%. |
| Compression set (ASTM-B) | 58%. |
| Creep at 200 p.s.i. | 62% (70° C.). |
| | further change). |

In addition, the molding qualities of the block polymer were excellent with respect to surface and detailing and the sample showed complete dimensional stability at 100° C.

*Example II*

Three block polymers according to the present invention were compared with two random copolymers. The test specimens contained no vulcanizing ingredients and no compounding ingredients other than a conventional antioxidant. Test results are shown in the table which follows. It will be noted that the block polymers of the present invention exhibit outstanding physical characteristics in all respects as compared with the relatively poor characteristics of the random polymers with which they are compared. In these tests, the Federal D die was employed, run at a rate of 2 in./min. crosshead except where otherwise noted.

TABLE I

| Composition | Styrene-Butadiene-Styrene | Styrene-Isoprene-Styrene | Styrene-Isoprene-Styrene | Random | |
|---|---|---|---|---|---|
| | | | | Styrene-Isoprene as in U.S. 2,975,160 Example VI | Styrene-Butadiene (emulsion polymerized) |
| Intended Segment Sizes (×1,000) | 20-100-20 | 30-100-20 | 20-120-10 | | |
| 300% modulus, p.s.i. | 400 | 260 | 220 | 100 | 60 |
| 500% modulus, p.s.i. | 740 | 460 | 320 | 100 | 60 |
| Tensile at break, p.s.i. | 1,560 | 3,230 | 1,410 | 60 | 60 |
| Elongation at break, percent | 660 | 930 | 1,140 | flow+>2,000 | >1,000 |
| Percent set | 8 | 16 | 19 | >200 | >100 |
| Rate of strain, in./min | 20 | 20 | 20 | 20 | 20 |
| Conditions—All at ambient temperature: | | | | | |
| Molding time, min | 5 | 10 | 3 | 5 | 5 |
| Molding temp, °C | 140 | 160 | 160 | 80-160 | 160 |
| Intrinsic Viscosity | 1.4 | 1.2 | 1.5 | 1.7 | ca. 2.0 |
| Percent w. styrene | 27 | 36 | 23 | 31 | 25 |

*Example III*

The tensile strength of the uncured double ended block polymer was tested after being press molded at 120° C. (without the addition of any vulcanizing materials). In addition to raw block polymers, compositions containing high abrasion furnace black and naphthenic extending oil both separately and together were prepared. A dispersion of the black in a hydrocarbon solvent was prepared by subjecting the black-solvent mixture to 1-2 minutes of high shear in a Waring Blendor, mixing the product with a solution of the block polymer and removing the solvent by coagulation with isopropanol followed by drying. The extending oil was added during milling at 150° C.

The tensile strength of the uncured double ended block polymer and the compositions containing oil and black were tested after being press molded at 120° C. (without the addition of any vulcanizing ingredients). The resultant test sheets, which were unvulcanized, had elongations and modulus values similar to conventional vulcanizates.

As may be seen from the table below, compositions having highly useful properties resulted from the uncured block polymers in combination with extender oil and carbon black both separately and together. The block polymer employed for the tests described below were prepared according to the process of Example VII. Microtensile die, 1.2 in./min. crosshead, 0.6 in. restricted length.

tained, which are greater than the values obtained with natural rubber under these conditions.

*Example V*

Styrene (60 grams) was dissolved in benzene (1400 grams), brought to 40° C., after which 0.003 mol of secondary butyl lithium was added. This was polymerized at about 40° C. in a reactor until all of the styrene had been converted to polymer which had an intrinsic viscosity of 0.24 dl./g. Thereafter isoprene was added to the reaction mixture (450 grams) and polymerization was continued until complete utilization of isoprene monomer. The styreneisoprene block polymer so formed had an intrinsic viscosity of 1.32 dl./g. and a styrene content of 14% by weight. Monomeric styrene (60 grams) was added and the polymerization continued until no monomer remained. The resulting styrene-isoprene-styrene block polymer had an intrinsic viscosity of 1.43 dl./g. and a styrene content of 22%.

The block polymer was blended with an equal amount of a polyisoprene having a cis content of about 92% and an intrinsic viscosity of 5.05 dl./g. The addition of the block polymer raised the zero shear bulk viscosity of the blend at both 27° C. and 100° C. to a level at least equivalent to a polyisoprene rubber of 7 dl./g. intrinsic viscosity.

The green strength (e.g., the stress-strain properties of the unvulcanized composition) of the 50/50 blend was compared with that of the unmodified polyisoprene at

| | Raw Block polymer | 15 phr. Oil | 50 phr. HAF* | 5p phr. HAF*20 phr. Oil | 50 phr. HAF 50 phr. Oil | 50 phr. HAF 75 phr. Oil |
|---|---|---|---|---|---|---|
| 300% Modulus, p.s.i. | 178 | 140 | 1,050 | 620 | 230 | 112 |
| 500% Modulus, p.s.i. | 266 | 208 | 1,680 | 1,200 | 540 | 260 |
| Ultimate Tensile, p.s.i. | 2,600 | 2,200 | 2,820 | 2,450 | 1,270 | 700 |
| Elongation, percent | 1,700 | 2,000 | 940 | 1,120 | 1,070 | 1,000 |

*HAF = High abrasion furnace black.

*Example IV*

A block copolymer containing 22% of styrene end blocks and 78% of a polyisoprene center block was blended with a stereoregular polyisoprene having an intrinsic viscosity of about 5 in a weight ratio of 1:3. The bulk consistency of the blend at 100° C. at zero shear rate was greater than that of the unmodified polyisoprene by a factor of about 10. The stress strain properties of the blend when combined with 50 phr. of a carbon black were excellent. At room temperature (23° C.) a yield point of 41 pounds and an elongation of 1000% were obtained which compare favorably with values usually obtained for natural rubber stocks and exceed the 30–35 pound yield and 200–300% elongations normally obtained with isoprene rubber. At a test temperature of 100° C., a yield of 18 pounds and an elongation of 730% were obthree different temperatures to obtain the following comparative data:

| | | Control (5.05 dl./gm.) Polyisoprene | 50/50 Blend |
|---|---|---|---|
| Green Strength: | | | |
| 23° C | Elongation, percent | 450 | 1,570 |
| | Ultimate Tensile, p.s.i. | 7.5 | 215 |
| 50° C | Elongation, percent | 330 | 1,100 |
| | Ultimate Tensile, p.s.i. | 5 | 65 |
| 70° C | Elongation, percent | 670 | 725 |
| | Ultimate Tensile, p.s.i. | 2 | 35 |
| Garvey Extrusion Index | | 5 | 10 |

The green strength of the blend is superior even to that of natural rubber and raises the green strength of ordinary polyisoprene to a remarkable extent.

The blend was also mill processed and vulcanized for 25 minutes at 135° C. using the following composition:

| | Gm. |
|---|---|
| Polymer blend | 50 |
| Zinc oxide | 2.5 |
| Stearic acid | 1.5 |
| 2,2'-methylene-bis(4-methyl-6-tertiary butyl phenol) | .5 |
| Di-ortho tolyl guanidine | .22.5 |
| N-oxydiethylene benzothiazole 2-sulfenamide | .56 |
| Soya lecithin/triethanolamine 95/5 mixture | .75 |
| Sulfur | 1 |

The following comparative data obtained on the gum stock were determined at 23° C.

| | Unmodified | 50/50 Blends |
|---|---|---|
| Mill rating | Good | Very Good |
| 300% modulus, p.s.i. | 160 | 220 |
| 500% modulus, p.s.i. | 280 | 500 |
| Final tensile, p.s.i. | 4,400 | 3,940 |
| Elongation, percent | 960 | 990 |
| Resilience, percent | 95 | 92 |

*Example VI*

For the purpose of comparison, a block polymer comprising a single styrene block and an isoprene block was prepared, the second styrene block (for the other end of the isoprene block) being omitted. This was prepared by the process as described in Example V with the exception that the second addition of styrene was not made. The block copolymer so obtained had a styrene content of 10% and an intrisic viscosity of 3.5. It had an ultimate tensile strength of 52 p.s.i. and an extension at break at 120%.

*Example VII*

Styrene (154 g.) was polymerized in benzene (1350 g.) solvent at 35–40° C. to a 50% conversion by addition of sec. butyl lithium (0.003 mol) at which time isoprene monomer was added to the reacting polystyrene block so formed had an intrinsic viscosity of 0.19 dl./g. Isoprene (450 grams) was added and polymerization continued to form a block polymer having an intrinsic viscosity of 1.04. Polymerization was then continued to complete removal of all of the styrene, the final product having a bound styrene content of 25%. In another preparation involving the same monomers, and utilizing butyl lithium initiator at the same temperature and initiator concentration, the tapered block polymer had an intrinsic viscosity of 1.1 dl./g. and a total styrene content of 30% by weight. This tapered block polymer was blended with ordinary high cis polyisoprene rubber and caused a marked improvement in green strength at 27° C. wherein the yield strength went from 30 to 45 p.s.i. and elongation from 290 to 510%.

We claim as our invention:

1. As a novel composition of matter, an unvulcanized elastomeric block copolymer having the general configuration

A—B—A wherein each A is an independently selected non-elastomeric monovinyl aromatic hydrocarbon polymer block having an average molecular weight of 2,000–100,000 and a glass transition temperature above about 25° C. the total block A content being 10–50% by weight of the copolymer, and B is an elastomeric conjugated diene polymer block having an average molecular weight between about 25,000 and 1,000,000 and a glass transition temperature below about 10° C., said copolymer having been prepared with a lithium-based catalyst and having a tensile strength at 23° C. in excess of about 1400 pounds per square inch.

2. A block copolymer according to claim 1 having the configuration polystyrene-polybutadiene-polystyrene.

3. A new composition of matter comprising an elastomeric homopolymer of conjugated dienes, and 5–50% by weight of a block copolymer according to claim 1.

4. A composition of matter comprising a major proportion of an elastomeric homopolymer of conjugated dienes having a cis 1,4-content of 80–100% and an average molecular weight of 200,000–1,000,000, 5–30% by weight of a block polymer according to claim 1, and 5–30% by weight of a polymerized conjugated diene having a cis 1,4-content of 80–100% and an average molecular weight of 2000–50,000.

5. A new composition of matter comprising an elastomer of the group consisting of conjugated diene homopolymers and random copolymers of conjugated dienes with vinylaromatic hydrocarbons and 5–50% by weight of block copolymers according to claim 1.

6. As a novel composition of matter an unvulcanized elastomeric block copolymer having the general configuration

A—B—A wherein each A is an independently selected non-elastomeric monovinyl aromatic hydrocarbon polymer block having an average molecular weight of 5,000–50,000 and a glass transition temperature above 25° C., the total block A content being 10–50% by weight of the copolymer, and B is an elastomeric conjugated diene polymer block having an average molecular weight between about 50,000–500,000 and a glass transition temperature below about 10° C., said copolymer having been prepared with a lithium-based catalyst and having a tensile strength at 23° C. in excess of about 1400 pounds per square inch.

7. A block copolymer according to claim 6 wherein the blocks A and B have a difference in glass transition temperature of at least 100° C.

8. A new composition of matter comprising an elastomer of the group consisting of conjugated diene homopolymers and random copolymers of conjugated dienes with monovinyl aromatic hydrocarbons and 5–50% by weight of block copolymers according to claim 6.

9. As a novel composition of matter, an unvulcanized elastomeric block copolymer having the general configuration

A—B—A wherein each A is a non-elastomeric monovinyl arene polymer block having an average molecular weight of 5,000–50,000 and a glass transition temperature above about 50° C., and B is an essentially linear conjugated diene polymer block having an average molecular weight between about 50,000 and 500,000 and a glass transition temperature below about −25° C., the blocks A and B having a difference of glass transition temperature of at least 125° C., the blocks A constituting 15–40% of the total polymer weight, said copolymer having been prepared with a lithium based catalyst and having a tensile strength at 23° C. in excess of about 1400 pounds per square inch.

10. As a novel composition of matter, an unvulcanized elastomeric block copolymer having the general configuration

A—B—A wherein each A is a non-elastomeric polystyrene block having an average molecular weight of 5,000–50,000, the total block A content being 10–50% by weight of the copolymer and B is an elastomeric polyisoprene block having an average molecular weight of 5,000–500,000 and a cis-1,4-content of 80–97%, said copolymer having been prepared with a lithium alkyl catalyst and having a tensile strength at 23° C. in excess of about 1400 pounds per square inch.

(References on following page)

References Cited by the Examiner

UNITED STATES PATENTS

| | | | |
|---|---|---|---|
| 2,666,042 | 1/1954 | Nozaki | 260—876 |
| 3,041,310 | 6/1962 | Luftglass et al. | 260—876 |
| 3,078,254 | 2/1963 | Zelinski et al. | 260—880 |
| 3,149,182 | 9/1964 | Porter | 260—880 |

FOREIGN PATENTS

| | | |
|---|---|---|
| 838,996 | 6/1960 | Great Britain. |
| 856,581 | 12/1960 | Great Britain. |
| 1,270,016 | 7/1961 | France. |

OTHER REFERENCES

Orr et al., The Synthesis and Identification of Block Copolymers of Butadiene and Styrene, Journ. Amer. Chem. Soc., vol. 79, June 20, 1957, pp. 3137–3141.

MURRAY TILLMAN, *Primary Examiner.*

JAMES A. SEIDLECK, SAMUEL H. BLECH,
*Examiners.*

N. W. SHUST, G. F. LESMES, *Assistant Examiners.*

UNITED STATES PATENT OFFICE
CERTIFICATE OF CORRECTION

Patent No. 3,265,765                                     August 9, 1966

Geoffrey Holden et al.

It is hereby certified that error appears in the above numbered patent requiring correction and that the said Letters Patent should read as corrected below.

Column 8, line 48, beginning with "Tensile strength" strike out all to and including "further change)." in line 55, same column 8, and insert instead

```
Tensile strength------------------3,000 p.s.i. (23° C.).
Elongation at break---------------1,000%.
Modulus at 500% elongation--------400 p.s.i.
Set at break----------------------17%.
Resilience (falling ball)---------58%.
Compression set (ASTM-B)----------62% (70° C.).
Creep at 200 p.s.i.---------------25% in 5 min.
                    (no further change).
``` columns 9 and 10, second table, in the heading to the fifth column, for "5p phr." read -- 50 phr. --; column 12, line 69, for "5,000" read -- 50,000 --.

Signed and sealed this 29th day of August 1967.

(SEAL)
Attest:

ERNEST W. SWIDER                           EDWARD J. BRENNER
Attesting Officer                       Commissioner of Patents